(12) United States Patent
Ohbayashi et al.

(10) Patent No.: US 6,432,550 B1
(45) Date of Patent: Aug. 13, 2002

(54) INK-JET RECORDING SHEET

(75) Inventors: Keiji Ohbayashi; Harue Ebisawa, both of Hino (JP)

(73) Assignee: Konica Corporation (JP)

( * ) Notice: Subject to any disclaimer, the term of this patent is extended or adjusted under 35 U.S.C. 154(b) by 44 days.

(21) Appl. No.: 09/612,675

(22) Filed: Jul. 10, 2000

(30) Foreign Application Priority Data

Jul. 13, 1999 (JP) .......................................... 11-198635

(51) Int. Cl.$^7$ ............................................... B32B 23/08
(52) U.S. Cl. ..................................................... 428/511
(58) Field of Search ......................................... 428/511

(56) References Cited

U.S. PATENT DOCUMENTS 6,165,606 A * 12/2000 Kasahara et al. ............ 428/323

FOREIGN PATENT DOCUMENTS

| JP | 56148584 | 11/1981 |
|----|----------|---------|
| JP | 2270588  | 11/1990 |

* cited by examiner

Primary Examiner—Edward J. Cain
(74) Attorney, Agent, or Firm—Bierman, Muserlian and Lucas

(57) ABSTRACT

An ink-jet recording sheet is disclosed. The recording sheet comprises ink absorption layers containing a cationic substance on both sides of a support having an opacity of not less than 94% according to JIS P 8138.

11 Claims, No Drawings

INK-JET RECORDING SHEET

FIELD OF THE INVENTION

The invention relates to an ink-jet recording sheet, particularly relates to paper for ink-jet printing capable of recording a character or a color image each having a high image quality on both of the sides thereof.

BACKGROUND OF THE INVENTION

Recently, the quality of image printed by an ink-jet printer is becomes to be equal to that of the image obtained by the silver halide photography accompanied with a rapid progress of the ink-jet recording technology.

Various kinds of color prints can be made by the ink-jet printer-accompanied with the spreading of ink-jet printers and digital cameras, and the use of the print printed by the ink-jet printer is diversified recently.

One of such the uses of the print is ink-jet recorded images formed on the both sides of recording sheet. The recording sheet capable of recording images on the both sides thereof is suitable to reduce the number of paper sheet for resource saving and to prepare a new color print to be made in a booklet form or a various types of cards such as a post card.

Some recording sheet having ink-jet recording layers on the both sides thereof have been proposed.

Japanese Patent Publication Open to Public Inspection (hereinafter referred to JP O.P.I.) No. 56-148584 discloses a method for preventing the stain on the back surface by using recording sheet having layer containing porous inorganic pigment particles on the both sides thereof to inhibit the penetration of the ink to the opposite side of the paper.

JP O.P.I. No. 2-270588 discloses ink-jet recording sheet excellent in the feeling of paper quality and prevented in the penetration of ink to the back side, in which ink absorption layers are provided on the both sides of the paper and the ink absorption layer is made thin for preventing the peeling off of the ink absorption layer.

JP O.P.I. No. 8-174996 discloses that ink-jet recording sheet can be obtained by providing an ink absorption layer mainly composed of an inorganic pigment and a binder on one side of the base paper and immersion or coating a cationic substance to the other side of the paper. On this paper, a clear image can be recorded on one side and an ink-jet record and a writing by various kinds of writing materials can be made on the other side, and the penetration of the ink to the opposite side of the paper is prevented. Such the recording sheet is mainly used as a card or a post card.

JP O.P.I. No. 9-286116 describes ink-jet recording sheet having ink absorption layer on the both sides of a substrate different from each other in the dot diameter formed when an ink droplet is adhered thereon. Ink-jet recording sheet without curling or ink penetration to the back surface can be obtained by such the methods.

SUMMARY OF THE INVENTION

Ink-jet recording sheet capable of forming high quality images on the both sides thereof has been investigated by the inventors. As a result of that, it has been found that the image formed on one side of the paper is transparently looked on the back side through the paper, or paper through image visibility, cannot always be sufficiently inhibited even when the dye fixing ability of the ink absorption layer is increased.

The paper through image visibility tends to be occurred when a black image, a character or picture, is printed on one side and no or low density image is printed on the other side of the paper.

The paper through image visibility cannot be sufficiently inhibited even when the image is recorded by a pigment ink and colored pigment particles are substantially fixed on the surface of the ink absorption layer and almost particles of the pigment are not penetrated into the ink absorption layer.

The paper through image visibility can be improved some degree by raising the opacity of the ink absorption layer by the addition of a coarse pigment particle or the use of an inorganic pigment having a high refractive index. In such the case, however, the density of the image printed by the ink-jet is considerably lowered and the paper through image visibility cannot be controlled only by the increasing of the dye fixing ability and the opacity of the ink absorption layer.

It has been found by the inventors that the paper through image visibility can be reduced without loss of the image density by improving both of the support and the ink absorption layer.

The object of the invention is to provide an ink-jet recording sheet in which the lowering of image density is small and the image is difficultly seen through the paper when images are printed on the other side of the paper by ink-jet printing.

The invention and the embodiments thereof are described below.

Ink-jet recording sheet comprising a support having an opacity of not less than 94% according to JIS P 8138 and ink absorption layers each containing a cationic substance and provided on the both sides of the support.

Ink-jet recording sheet comprising a support having a Kobb Test permeability of not more than 10 g per square meter determined according to JIS P 8140 using pure water containing 30% by weight of diethylene glycol for a contacting time of 10 seconds and a opacity of not less than 94% according to JIS P 8138, and ink absorption layers each containing a cationic substance and provided on the both sides of the support.

The support is preferably a hydrophobic support.

The support is preferably a support comprised of a paper substrate covered with polyolefin resin layers on the both sides thereof, and at least one of the olefin resin layers contains a white pigment.

Each of the ink absorption layers provided on both sides of the support preferably includes at least one porous layer.

The ratio of D1/D2 is preferably within the range of from 0.90 to 1.1 wherein D1 and D2 are each the diameter of dot formed by a droplet of ink adhered on the ink absorption layer provided on one side of the support and that of the dot formed on ink absorption layer provided on the other side of the support, respectively.

Ink-jet recording sheet comprising a plastic film support containing a white pigment and having a opacity according to JIS P 8138 of not less than 94% and ink absorption layers containing a cationic substance each provided on the both sides of the support.

Ink-jet recording sheet comprising a support comprised of paper support having a weight of from 100 g to 250 g per square meter covered with a polyolefin resin containing a white pigment, which has an opacity according to JIS P 8138 of not less than 94%, and ink absorption layers each containing a cationic substance and provided on the both sides of the support.

The cationic substance is preferably a compound having a quaternary ammonium salt group.

DETAILED DESCRIPTION OF THE INVENTION

The support of the ink-jet recording sheet of the invention has an opacity according to JIS P 8138 of not less than 94%.

When the opacity is less than 94%, the image tends to be seen through the paper when the recording sheet is observed from the opposite side. The opacity of the support is preferably not less than 95%, particularly not less than 96%.

Paper, white plastic film, clothes, and paper laminate with plastic resin on one or both sides thereof are usable as the support having an opacity of not less than 94%.

The opacity of paper support of not less than 94% can be attained by increasing the weight of the paper or addition of white a pigment into the paper. The weight of paper is usually from 100 g to 300 g per square meter even though the weight may changed depending on the presence of the white pigment. The weight is usually from 150 g to 300 g, preferably from 200 g to 300 g, more preferably from 220 g to 300 g, when no white pigment is used.

When the white pigment is used, the weight is usually from 100 g to 250 g, preferably from 150 g to 200 g, even though the weight is considerably changed depending on the amount of the white pigment.

Titanium oxide, barium sulfate, zinc oxide, silica and calcium carbonate are usable as the white pigment to be used in the paper. Examples of preferable hydrophobic support include a plastic film and a paper support laminated with plastic resin on one or both sides thereof.

When the plastic film support is used, a white plastic film is preferred in which the white pigment is added into the resin of film to make the opacity to 94% or more.

As the white pigment, titanium oxide and barium sulfate are usable. In such the case, there are two ways to from the white plastic film, in one of them the opacity is made by the white pigment it self and in another of them the opacity is made according to the scattering by foams formed in the course of production of the film using the white pigment as the nuclear of the foams.

For the plastic film, a polyolefin resin such as polyethylene and polypropylene, a polyester resin such as poly(ethylene terephthalate) and poly(ethylene naphthalate), poly(vinyl chloride) and cellulose triacetate are preferably used. The thickness of the plastic film is usually from 120 to 300 $\mu$m, preferably from 150 to 250 $\mu$m.

The using amount of the white pigment is usually from 1 to 50%, preferably from 5 to 30%, by weight of the plastic resin, even though the amount may be changed depending on the diameter or kind of the white pigment.

The plastic film may be one constituted by laminating two or more plastic film. In such the case, the kind if the films to be laminated may be the same or different from each other.

Furthermore, a paper support covered with plastic resin on one or both sides thereof may also be used. In such the case, one or both sides of a paper support having a weight of from 100 to 250 g, preferably from 120 to 220 g, is covered with the plastic resin to make the opacity of the support to not less than 94%.

The foregoing plastic resin to be used in the plastic film support can be used. Polyolefin resin is preferably used since the polyolefin resin is easily extruded in a molten state on the paper support to produce the resin laminated paper support. Preferable examples of the polyolefin resin include polyethylene, polypropylene, polyisobutylene, and a copolymer mainly composed of ethylene or propylene, and polyethylene resin is most preferable. The thickness of the layer of the preferable resin laminated on the paper support is usually from 5 to 60 $\mu$m, preferably from 10 to 50 $\mu$m. In this case, the thickness of the layer on one of the surface and that on the other surface may be the same or different.

The support may be one produced by coating a dispersion of hydrophobic resin on the paper support to form a hydrophobic resin layer. The dispersion of hydrophobic resin can be produced by emulsion polymerization of one or more kinds of copolymerizable monomers such as methyl acrylate, ethyl acrylate, propyl acrylate, butyl acrylate, methyl methacrylate, ethyl methacrylate, propyl methacrylate, butyl methacrylate, acrylamide, styrene, hydroxyethyl methacrylate, vinyl chloride, vinyl ether, ethylene, divinylbenzene, vinyl acetate and butadiene.

In this case, the thickness of the plastic resin layer is usually from 2 to 40 $\mu$m, preferably from 3 to 20 $\mu$m.

It is preferable to contain the forgoing white pigment in one of the paper and the plastic resin to make the opacity to not less than 94%. It is particularly preferable to contain the white pigment in the plastic resin.

According to the invention, the paper through image visibility is sufficiently inhibited just after the recording by the ink-jet printing. However, in the case of a support sufficiently absorbing humid such as a paper support is used, the dye is penetrated into the support and the paper through image visibility tends to be raised when the print is stored under a condition of high humidity and temperature. It is found that a recording sheet using a support having a relatively low humid absorbability is preferably to improve such the problem.

Accordingly, it is preferable that the use of a support having a humid absorbability of not more than a specified degree, not an ordinary paper support having a high humid absorbability, from the view point of that not only the paper through image visibility just after recording by the ink-jet is sufficiently inhibited, but also the paper through image visibility is difficultly appeared since the degree of penetration of dye into the support is small. The use of the non-humid-absorbable support is further preferable since the paper through image visibility is further inhibited by inhibition of the penetration of dye into the support.

It is further found regarding the ink-jet recording sheet that a high quality print inhibited in the formation of stripe-like unevenness of image can be obtained when an image is recorded on one surface of the recording sheet after recording another image on the other surface of the paper. In such the case, the stripe-like unevenness of image is inhibited not only in the previously recorded image but also in the image later recorded on the other side of the recording sheet. Although the reason of such the effect is not clear yet, it is supposed as follows.

An ordinary ink-jet recording sheet using a paper support having a high humid absorbability tends to be cockled when an image is printed on one side thereof since the support absorbs the ink. In an ink-jet recording sheet using a support having a specified humid absorbability which difficultly absorbs humid, the cockling caused by printing an image on one side of the paper is inhibited. Accordingly, the formation of the stripe-like unevenness in the image printed on the back side of the paper is inhibited since the distance between the recording sheet and the printer head is constantly maintained so that the image can be uniformly printed.

From the above-mentioned viewpoint, it is further preferable that the support is a support having a Kobb-water-permeability of not more than 5 g/m$^2$. The most preferable recording sheet using is one using a support of which Kobb-water-permeability of 0 g/m$^2$.

Moreover, the recording sheet using the non-humid absorbable support is preferred since the formation of stripe-like unevenness of image can be inhibited and no cockling is occurred after printing on the both sides of the recording sheet. As a result of that, a printed image having a high quality feeling can be obtained.

A plastic. film support or a paper support coated with a plastic resin on the both sides thereof is preferable as the hydrophobic support, and a paper support comprising paper coated with a hydrophobic resin on the both sides thereof is particularly preferred.

The preferably usable support comprised of paper coated with the hydrophobic resin on the both sides thereof is described below.

The weight of the paper is preferably from 100 to 250 g, particularly from 120 to 220 g, per square meter as described above.

The weight of not less than 100 g/m$^2$ is preferable, since a sufficient opacity can be obtained when the concentration of white pigment in the hydrophobic resin layer or the thickness of the hydrophobic resin layer is relatively small.

The weight of not more than 250 g/m$^2$ is preferable since the stiffness of the support is suitable for transporting in the printer.

Paper, which is employed as a support in the present invention, is comprised of wood pulp as the main raw material, and if desired, in addition to the wood pulp, employed is synthetic pulp such as polypropylene and the like, as well as synthetic fiber such as nylon, polyester and the like. Employed as wood pulp may be, for example, any of LBKP, LBSP, NBKP, NBSP, LDP, NDP, LUKP, and NUKP.

Preferably employed as the aforementioned pulp is chemical pulp (sulfate pulp and sulfite pulp) which comprise minimal impurities. Further, pulp, which is subjected to bleaching to enhance whiteness, is also advantageous.

Into paper may suitably be incorporated sizing agents such as higher fatty acids, alkylketene dimers, and the like, white pigments such as calcium carbonate, talc, titanium oxide, and the like, paper strength enhancing agents such as starch, polyacrylamide, polyvinyl alcohol, and the like, fluorescent whitening agents, moisture maintaining agents such as polyethylene glycol, and the like, dispersing agents, softening agents such as tertiary ammonium compound, and the like.

During the paper making stage or after paper making, the paper may be further calendered and smoothened. Paper. density is commonly between 0.7 and 1.2 g/m$^2$ (JIS P 8118). Further, the paper stiffness is preferably between 20 and 400 g under conditions specified in JIS P 8143.

Surface sizing agents may be applied onto the surface of the paper. Employed as surface-sizing agents may be the same as those described above, which can be incorporated into the base paper.

The pH of said paper, when measured employing a hot water extraction method specified in JIS P 8113, is preferably between 4 and 9.

Polyethylene, which is employed to laminate both surfaces of paper, is mainly low density polyethylene (LDPE) and/or high density polyethylene (HDPE). And further, other LDPE, polypropylene, and the like may be employed.

As for the titanium oxide, white pigment, barium sulfite, zinc oxide, calcium carbonate etc. are listed. Titanium oxide is particularly preferable among these. Specifically, rutile or anatase type titanium oxide is preferable. The amount of titanium oxide is commonly between 1 and 50 percent by weight with respect to polyolefin, and is preferably between 2 and 30 percent by weight.

The white pigment can be applied to one side or both sides of the polyolefin resin layers whereby translucency and whiteness is improved.

In order to adjust background whiteness, high heat resistant pigments and fluorescent whitening agents may be incorporated into the polyolefin layer.

Listed as color pigments may be, for example, ultramarine blue, iron blue, cobalt blue, phthalocyanine blue, manganese blue, serurian blue, tungsten blue, molybdenum blue, anthraquinone blue, and the like.

Cited as fluorescent whitening agents are, for example, dialkylaminocoumarin, bisdimethylaminostilbene, bismethylaminostilbene, 4-alkoxy-1,8-naphthalenedicarboxylic acid-N-alkylimide, bisbenzoxazolylethylene, dialkylstilbene, and the like.

Further, the aforementioned polyethylene laminated paper support preferably has the following properties.

Tensile strength: preferably 2 to 30 kg in the longitudinal direction, and 1 to 20 kg in the lateral direction, employing a method, specified in JIS P 8113.

Tearing strength: preferably 10 to 20 g in the longitudinal direction and 20 to 200 g in the lateral direction, employing a method, specified in JIS P 8116.

Whiteness: preferably $L^*$=80 to 95, $a^*$=−3 to +5, and $b^*$=−6 to +2, wherein $L^*$, $a^*$, and $b^*$ are specified in JIS Z 8729.

Clark stiffness: the preferred support has a Clark stiffness of the recording sheet in the conveyance direction of 50 to 300 cm$^2$/100.

The surface of the support may be highly smooth or fine grained. A glossy recording sheet is obtained when the support has the surface with a high smoothness. A fine grain surface recording sheet is obtained when the support has the fine grained surface.

When the polyolefin resin layer is provided on the both sides of the paper, the thickness and the composition of the resin layer and the surface quality of the each side may be the same or different. It is preferable that the surface qualities of each of the surfaces are the same when the recording sheet is used for making a print album.

Besides, when the recording sheet is used as a post card, it is not necessary that the qualities of the surfaces are the same and various surface qualities such as glossy, fine grain and matted surface may be optionally used in combination.

It is preferable for obtaining a glossy surface that the glossiness of the polyolefin resin layer is from 20 to 90% in the mirror surface glossiness at 60° according to JIS Z 8741.

When the support is used for fine grain surface ink-jet recording sheet, the surface of the hydrophobic resin layer preferably has a center line average roughness measured by a standard length of 2.0 mm and a cut-off value of 0.8 mm according to JIS B 0601 of from 0.8 to 4.0 μm and a mirror surface glossiness at 60° according to JIS Z 8741 of from 10 to 40%. The mirror glossiness at 60° of the surface of the hydrophobic resin for obtaining a matted surface is usually from 2 to 10%.

The glossy or fine grained surface of the polyolefin resin layer is formed by pressing the surface of the resin layer after laminating to a glossy roller or an embossing roller to form a fine pattern on the surface.

The embossing can be performed by two methods. In one of them, the embossing calendering is applied at a temperature near an ordinary temperature. In another method, the pattern is made by using a cooling roll on which the pattern is engraved while cooling the extruded molten resin layer just after the extrusion of the resin. The later method is preferable since the embossing can be accurately and uniformly performed with a relatively small pressure.

The ink absorption layer provided on the both sides of the support is described below. The ink absorption layers provided on the both sides of the support each contain a cationic substance.

When prints, on the both sides of each of which image are recorded by ink-jet recording, are piled up and left, the diffusion of the image is accelerated since the amount of remained solvent is raised in the piled portion where the images are formed on both sides of the print. Therefore, it is necessary to make higher the resistivity against the diffusion of the image dye compared to the case in which the image is printed on one side of the recording sheet.

Examples of the cationic substance usable in the invention include a cationic polymer, a coupling agent having a quaternary ammonium group, and an inorganic pigment having a cationic surface. Among them, the cationic polymer is particularly preferable.

Any known cationic polymer can be optionally selected from ones usually used in ink-jet recording sheet, and a cationic polymer having a tertiary amino group or a quaternary ammonium group is preferred. Examples of such the substance include polyethyleneimine, polyacrylamine, dicyandiamido-polyalkyleneamine, a condensation product of dialkylamine and epichlorohydrine, polyvinylamine, polyvinylpyridine, polyvinylimidazole, a condensation product of diaryldimethyl-ammonium salt, and a quaternarized compound of polyacrylic ester. The cationic polymer having a quaternary ammonium salt group is most preferable. The polymer having a quaternary ammonium salt group is a homopolymer of a monomer having a quaternary ammonium salt group or a copolymer of such the monomer and another copolymerizable monomer, and one having a weight average molecular weight of from 2,000 to 100,000, particularly from 3,000 to 80,000, is preferable.

The silane coupling agent having a quaternary ammonium salt group may be used by various procedures, for example, the coupling agent is added in a form of previously reacted with an inorganic fine particle, the coupling agent is added at an optional step from the coating to the drying of the ink absorption layer, and the coupling agent is over coated in a form of solution onto the previously formed ink absorption layer. Penetration of dyes to the opposite side of the paper can be inhibited by preventing bleeding in the ink receiving layer or diffusion to side closer to the support of the dyes by employing these cationic compounds. Content per 1 $m^2$ of the compound to be employed is 1 to 50 g, preferably 2 to 30 g in each side for an inorganic pigment having cationic surface, and 0.1 to 10 g, preferably 0.2 to 5 g in each side for a cationic polymer or a silane coupling agent having quaternary ammonium base.

Examples of the inorganic fine particle having the cationic surface include alumina, pseudobaemite, and cation-modified colloidal silica.

The ink absorption layer is classified into an ink absorption layer mainly comprised of hydrophilic polymer and a porous ink absorption layer containing-inorganic fine particles in a high ratio to a hydrophilic binder.

The former is one which temporarily absorbs ink by swelling of the hydrophilic binder, and the image is remained, after evaporation of the solvent, in a form of dye imagewise contained in the binder in the original state.

The later is one in which the ink is absorbed and temporarily held in the porous layer. The later is preferable since it has a high ink absorbing ability. As a result of that, a blotch-like unevenness in the image is difficultly formed and the surface of it is dried state after the ink-jet recording. Accordingly, the later is preferable from the viewpoint of easy handling.

With respect to the ink-jet recording sheet for recording images on both sides thereof, it is necessary to sufficiently dry the paper after recording so that two or more sheets of the recording sheet can be piled without adhesion with each other when the ink absorption layer is swellable type. It is not so, the sheets each having the printed images on the both sides are easily adhered with each other.

The ink-absorptive layer is a void type ink absorbing layer comprised of a hydrophilic binder and fine inorganic particles. Listed as examples of fine inorganic particles can be white inorganic pigments such as soft calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthesized amorphous silica, colloidal silica, alumina, colloidal alumina, pseudoboehmite, aluminum hydroxide, lithopone, zeolite, magnesium hydroxide, etc.

Primary particles without any treatment may be employed as such inorganic particles. Alternatively, secondary aggregated particles may be formed and employed.

In order to obtain high maximum density and excellent surface characteristics, fine particles are preferably employed so as to form an average particle size of less than 500 nm, more preferably less than 200 nm.

It is preferred to form fine voids in view of obtaining high density when the image is recorded by ink jet. For this purpose silica or pseudoboehmite is preferable. Particularly preferable is silica synthesized by gas phase method, colloidal silica and pseudoboehmite, having average particle diameter of 200 nm.

The average particle diameter of said fine inorganic particles is obtained as follows. Particles themselves, or the cross-section or the surface of a void layer is observed employing an electron microscope, and diameters of 100 randomly sampled particles are recorded. Then the average diameter is obtained as a simple average (a number average). The particle diameter of each particle as described herein is the diameter of an assumed circle which has the same area as the projection area of the particle.

Employed as hydrophilic polymers employed in the void layer are those which are employed in the swelling type ink absorption layer. However, the preferred hydrophilic polymer is polyvinyl alcohol.

Polyvinyl alcohols, which are preferably employed in the present invention, include, other than common polyvinyl alcohol obtained by hydrolyzing polyvinyl acetate, modified polyvinyl alcohols such as polyvinyl alcohol in which the terminals are subjected to cationic modification, modified polyvinyl alcohol comprising an anionic group, and the like.

Polyvinyl alcohol having an average degree of polymerization of at least 300, which is obtained by hydrolyzing vinyl acetate, is preferably employed, and particularly one having a degree of polymerization of 1,000 to 5,000 are preferably employed.

Polyvinyl alcohol having a saponification ratio of 70 to 100 percent is preferred and one having a saponification ratio of 80 to 99.5 percent is particularly preferred.

Ratio of inorganic fine particles to hydrophilic binder employed in the ink absorption layer is around 2:1 to 10:1, and particularly 3:1 to 8:1 is preferable.

Further, when the aforementioned void layer comprises polyvinyl alcohol as the hydrophilic polymer, it is preferred to employ a hardening agent to improve the film forming properties of the film as well as to increase the film strength.

In case that the hydrophilic binder is polyvinyl alcohol, that is most preferable example, epoxy compound, boric acid or its derivative is preferably incorporated as the hardening agent. The preferable examples are boric acid or its derivative.

Boric acids or salts thereof are oxygen acids and salts thereof having a boron atom as the central atom, and specifically include ortho-boric acid, meta-boric acid, hypoboric acid, tetraboric acid, pentaboric acid, and salts thereof.

The employed amount of boric acids or salts thereof may vary widely depending on the amount of fine inorganic particles and hydrophilic polymers in the coating composition. However, said amount is commonly between 1 and 60 percent by weight of the hydrophilic polymers, and is preferably between 5 and 40 percent by weight.

In the ink-receiving layer and an optional layer provided on demand of the ink-jet recording sheet, various additives can if desired be added.

For example, it is possible to add various additives, known in the art, such as UV absorbers described in Japanese Patent Publication Open to Public Inspection Nos. 57-74193, 57-87988 and 2-261476, anti-fading agents described in Japanese Patent Publication Open to Public Inspection Nos. 57-74192, 57-87989, 60-72785, 61-146591, 1-95091, 3-13376, etc., various anion, cation or nonion surface active agents, fluorescent whitening agents described in Japanese Patent Publication Open to Public Inspection Nos. 59-42993, 59-52689, 62-280069, 61-242871, 4-219266, etc., pH-adjusting agents such as sulfuric acid, phosphoric acid, acetic acid, citric acid, sodium hydroxide, potassium hydroxide, potassium carbonate, etc., antifoaming agents, lubricants such as diethylene glycol, etc., antiseptics, thickeners, antistatic agents, matting agents, etc.

The dry thickness of the porous ink absorption layer which is decided depending on the relation between the ink absorption amount, is usually from 20 to 70 $\mu$m, and preferably from 30 to 50 $\mu$m from the view point of necessity of that all the solvent of ink should be temporarily held in the layer. Particularly preferable dry thickness is from 35 to 50 $\mu$m.

The ink absorption layer provided on the both sides of the support may be each comprised by a single layer or two or more sub-layers. When the layer is constituted by plural sub-layers, the compositions of each of such the sublayers may be different, and the sub-layers each preferably contains the cationic substance.

The composition, the thickness or the surface quality of each of the layers to be provided on the front side and the back side of the support may be the same or different from each other.

When the a colored image is principally printed on one side and a character image is principally printed on the other side such as in a card and post card, it is preferable to respectively design each of the ink absorption layers so that the properties of the each layer are suitable for the printing condition for each of the image.

On the other hand, when the recording sheet is used for making an album, the surface quality of both of the sides of the recording sheet are preferably the same, and the glossiness and the whiteness of the both sides may be different from each other. However, the ink absorbing properties of the both sides are preferably the same on both of the sides. Although glossiness and the whiteness of the front side and the back side may be different from each other, the ink absorption properties of the both sides are preferably almost the same.

When the ink absorption property of the front side and that of the back side of the recording sheet is different from each other, prints each quite different in the tone are obtained even when the same images are printed by the ink-jet printing under the same conditions. For inhibit such the problem as small as possible, it is preferable to make the ink-jet suitability of the both sides to as the same as possible. Accordingly, it is preferable that the ratio of D1/D2 is from 0.90 to 1.1, wherein the diameter of dot formed by adhering one droplet on the ink absorption layer of the front side and that of the back side are each D1 and D2, respectively.

The dot diameter is an average dot diameter of arbitrarily measured 20 dots. A single dot formed by shooting on a recording paper is photographed by a microscope or a CCD camera, and area of the dot is measured. Diameter of circle having same area of the dot is denoted as the dot diameter.

The spreading area of the ink droplet is within the range of almost the same when the ratio of D1/D2 is from 0.90 to 1.1, and the color reproducibility of the same image printed on the both sides of the recording sheet are preferably become to almost the same.

To make the ratio of D1/D2 to a value with in the above-mentioned range, the constitution of the ink absorption layer on the front side and that on the back side are made to substantially the same. In the ink absorption layers having substantially the same constitution, the same inorganic fine particle, the same hydrophilic binder and the same cationic substance are contained. It is preferable that the layer constitution is also made as similar as possible.

However, a tinting agent for giving a small difference of tone, a fluorescent whitening agent, or a matting agent may be different since they do not influence on the ink absorbing ability.

The ink absorbing capacity of the front side and the back side ma be different from each other within the range in which the image is not influenced.

The ratio of the ink absorbing capacity of the front side and that of the back side is usually from 0.8 to 1.2.

The static friction coefficient of the recording sheet according to the invention is preferably not more than 0.8 from the viewpoint of continuous transportation.

When the static friction coefficient is not more than 0.8, double feeding or stopping of paper supply is, difficultly occurred. It is particularly preferable to make to 0.8 or less. The static friction coefficient is usually not less than 0.2 although there is no limitation on the lower limit.

The static friction coefficient of the both sides of not more than 0.8 can be attained by controlling the surface properties, such as the surface quality and the slipping property, of the ink absorption layers of the both sides.

In concrete, the static friction coefficient can be easily controlled by an addition of matting agent for making a projection on the surface of the ink absorption layer on the both sides, or an addition of a slipping agent, such as a wax, silicone compound and a fluorinated compound, for giving a slipping property to the surface of the ink absorption layer. The addition of the matting agent is particularly effective.

As the matting agent, an inorganic particle, such as a particle of silica, calcium carbonate or talc, and an organic latex, such as a latex of polystyrene, polyethylene, or poly(methyl methacrylate). Among them the organic latex is preferred.

The matting agent having an average diameter of not less than 5 μm is preferable since the slipping property can be improved by such the matting agent with a relatively small influence on the glossiness. The matting agent having an average diameter of from 7 to 30 μm is particularly preferred.

The matting agent having a narrow diameter distribution is preferable since the loss of glossiness is small. The distribution degree, the ratio of the standard deviation of the size distribution of the particles to the average diameter of the particles, is preferably not more than 2, more preferably not more than 1.5.

The adding amount of the matting agent is usually from 0.01 to 0.5 g per square meter even though the amount may be changed depending on the diameter of the matting agent and the thickness of the ink absorption layer in which the matting agent is to be added.

The latex is a latex of polymer of a polymerizable monomer having at least one unsaturated bond in the molecular thereof or a copolymer of two or more kinds of the polymerizable monomer, which is synthesized by an emulsion polymerization method.

EXAMPLES

Examples of the invention are described below. In the examples, % is percentage by absolute dried weight except when the specific description is added.

Example 1

The following coating liquid was coated on the both sides-of paper supports each having the weight and the opacity described in Table 1 so that the amount of dried solid composition is 12 g per square meter of the support. Thus Recording sheets 1 through 6 were prepared.

Composition of coating liquid per liter of the coating liquid

| Polyvinyl alcohol | 30 g |
| Cationic colloidal silica | 140 g |
| Polyvinylpyrrolidone | 5 g |
| Epoxy cross-linking agent | 2 g |

Comparative Example 1

Recording sheets 4R through 6R were prepared in the same manner as in recording sheets 4 through 6 in Example 1 except that the cationic colloidal silica in the coating liquid is replaced by an ordinary anionic silica.

The samples of ink-jet recording sheet prepared in Example 1 and Comparative example 1 were evaluated in the paper through image visibility and the image spreading by the following procedures.

<Paper Through Image Visibility>

A black solid image was printed on one side of the sample, and the reflective density was measured just after the printing from the back side of the sample.

The reflective density at the portion on not printed image was set at zero.

Moreover, the printed sample was stored for two days at a temperature of 40° C. and a relative humidity of 80%. Then the reflective density was measured from the back side of the sample.

The reflective density of not more than about 0.05 is acceptable in the practical use. The density of not more than 0.03 does not rise any problem in almost cases.

<Spreading of Image>

A line having a width of about 250 μm was printed by the ink-jet printer with a black ink on one side of the sample, and a magenta solid image was printed on another sample. These samples were piled so that the image printed surfaces there of were contacted and stored for two days at a temperature of 40° C. and a relative humidity of 80%.

Then the width of the line was measured by a microdensitometer, and the spreading ratio of the width of the line after the storage to that of before the storage was calculated. The spreading ratio of the line width of not more than 1.2 does not cause any problem in the practical use.

<Evaluation of the Stripe-like Unevenness of Image>

A black line having a width of 0.3 mm was printed on one side, front side, of each of recording sheets 1A through 4A by an ink-jet printer PM750 manufactured by EPSON Co. Ltd., then the same line was printed on the other side, back side, of each of the samples. The line-like reducing density in the image printed on the back side was visually evaluated and classified into the following ranks.

A: No stripe-like unevenness is observed.

B: There is no problem for practical used even though the stripe-like unevenness is slightly observed.

C: There is no problem for practical used even though the stripe-like unevenness is observed.

D: The stripe-like unevenness is clearly observed.

Results regarding the recording sheet prepared samples in Example 1 and Comparative example 1 are shown in Table 1.

TABLE 1

| Recording Sheet | Weight of Support | Opacy of Support | Paper through image visibility | | Spreading of image |
| --- | --- | --- | --- | --- | --- |
| | | | Initial | After storage | |
| 1 (Comp.) | 100 g | 84.7% | 0.22 | 0.31 | 1.08 |
| 2 (Comp.) | 150 g | 90.4% | 0.13 | 0.20 | 1.07 |
| 3 (Comp.) | 180 g | 92.9% | 0.09 | 0.16 | 1.07 |
| 4 (Inv.) | 200 g | 94.2% | 0.05 | 0.09 | 1.06 |
| 5 (Inv.) | 250 g | 95.5% | 0.03 | 0.06 | 1.05 |
| 6 (Inv.) | 300 g | 96.2% | 0.02 | 0.05 | 1.05 |
| 4R (Comp.) | 200 g | 94.2% | 0.15 | 0.30 | 1.57 |
| 5R (Comp.) | 250 g | 95.5% | 0.13 | 0.28 | 1.54 |
| 6R (Comp.) | 300 g | 96.2% | 0.11 | 0.22 | 1.56 |

The results in Table 1 show that the paper through image visibility is small and the printed image is hardly influenced by the image printed back side in Recording sheet 4 through 6 each using the support having an opacity of not less than 94% and the cationic colloidal silica in the ink absorption layer.

The sample using the support having the opacity of not less than 95% is particularly excellent.

Contrary to that, the paper through image visibility, particularly that after storage at the high temperature and humidity, is large in the recording sheet using the support having the opacity less than 94%.

The paper through image visibility is large when the ink absorption layer containing the non-cationic inorganic pigment.

As a result of the evaluation on the stripe-like unevenness formation, the formation of stripe-like unevenness in each of the samples are on the level, rank C, at which any problem in the practical use is not raised.

Example 2

Samples of recording sheet were prepared in the same manner as in Recording sheet 1 through 3 in Example 1 except that a zinc oxide particle was added into the paper support. The evaluation results of the samples are shown in Table 2.

TABLE 2

| Recording Sheet | Weight of Support | Opacy of Support | Paper through image visibility | | Spreading of image |
|---|---|---|---|---|---|
| | | | Initial | After storage | |
| 11 (Comp.) | 100 g | 92.2% | 0.08 | 0.12 | 1.05 |
| 12 (Inv.) | 150 g | 94.5% | 0.04 | 0.06 | 1.06 |
| 13 (Inv.) | 180 g | 96.3% | 0.02 | 0.03 | 1.06 |

It is understood according to the results in Table 2 that the paper through image visibility is improved by the addition of the zinc oxide particle by which the opacity of the support is improved when the thin paper is used.

As a result of the evaluation on the stripe-like unevenness formation, the formation of stripe-like unevenness in each of the samples are on the level, rank C, at which any problem in the practical use is not raised.

Example 2-1

The supports shown in Table 2-1 were prepared (the support used in Recording sheet 1A to 4A are each support 1 to 4, respectively. The prepared supports were as follows:

Support 1: High quality paper having a weight of 250 g/m² and an opacity of 95%, Support 2: Baryta paper having a weight of 250 g/m² and an opacity of 95%, Support 3: Art paper having a weight of 250 g/m² and an opacity of 95%, and Support 4: A support having an opacity of 95% which was prepared by laminating raw paper having a weight of 170 g/m² with polyethylene resin containing anatase type titanium oxide. The both surface of each of the support were subjected to a corona discharge treatment and coated with 0.05 g/m² of a gelatin subbing layer.

<Preparation of Coating Liquid 1-1>

Into 900 ml of purified water, 180 g of fine particle of silica having an average diameter of primary particles of 7 nm, which was synthesized by a vapor phase method, was added while stirring by a high speed homogenizer to form an aqueous dispersion of silica. Into thus obtained dispersion, 100 ml of a 25% solution of exemplified mordant Mor-1, a cationic mordant, was added and dispersed for 30 minutes by the high speed homogenizer. Thus a pale bluish transparent dispersion was obtained. Then 1 ml of a 10% aqueous solution of polyvinyl alcohol having an average polymerized degree of 300 and an average saponificated degree of 88% was added to the dispersion, and 530 ml of a 5% aqueous solution of polyvinyl alcohol having an average polymerized degree of 3500 and an average saponificated degree of 88%, which contains 4% by weight of ethyl acetate, was further added gradually. Thereafter, 40 ml of 4% aqueous solution of boric acid as a hardener, and 50 ml of 10% aqueous solution of gelatin were added to prepare coating liquid 1-1 for forming a space-having type ink absorption layer.

<Preparation of Recording Sheet 1A Through 4A>

The coating liquid 1-1 was coated on one side of each of the foregoing supports so as to provide a porous ink absorption layer having a dry thickness of 36 μm. Then the same coating liquid was coated on the opposite side of the support so as to provide a porous ink absorption layer having a dry thickness of 36 μm. Thus recording sheet 1A through 4A were prepared.

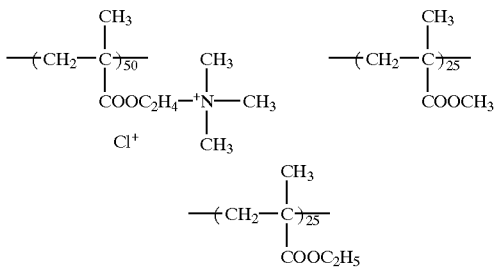

Mor-1 average molecular weight≈30,000

Obtained recording sheet samples 1A through 4A were evaluated in the same manner as in example 1. Results are shown in Table 2-1.

The stripe type unevenness formed in the image printed on the back side was evaluated with respect to each of the samples was evaluated in the foregoing method. The results are shown in Table 2-1.

TABLE 2-1

| Recording paper | Weight of support (g) | Cup permiability (g/m²) | Paper through image visibility | | Spreading ratio | Stripe-like uneveness |
|---|---|---|---|---|---|---|
| | | | Before storage | After storage | | |
| 1A | 250 | 24 | 0.03 | 0.07 | 1.06 | C |
| 2A | 250 | 12 | 0.04 | 0.05 | 1.12 | C |
| 3A | 250 | 3 | 0.03 | 0.03 | 1.11 | B |
| 4A | 170 | 0 | 0.03 | 0.03 | 1.14 | A |

The results in Table 2-1 show that recording sheet 1A can be practically used without any problem since the paper through image visibility is small but the stripe-like unevenness of image was observed.

In Recording sheet 2A using the baryta paper having the opacity of 95% and the Kobb-water-permeability of 12 g/m², the raising in the paper through image visibility during the storage is small but the stripe-like unevenness in the image printed on the back side is observed.

In Recording sheet 3A using the art paper having the opacity of 95% and the Kobb-water-permeability of 3 g/m², the raising in the paper through image visibility during the storage is small and the formation the stripe-like unevenness in the image printed on the back side is improved.

In recording sheet 4A using the paper support coated with polyethylene resin on the both sides having the opacity of 95% and the Kobb-water-permeability of 0 g/m², the raising in the paper through image visibility during the storage is almost not and the stripe-like unevenness in the image printed on the back side is not formed, and a high quality print can be obtained.

Example 3

Three kinds of paper each having a moisture content of 6.5% by weight and a weight of 110 g/m², 140 g/m² and 170 g/m², respectively, were prepared. The both sides of each of the paper, the following three kinds of polyethylene resin was laminated by a melt extrusion method so as to make the resin layer thickness to 30 μm. Thus nine kinds of polyethylene laminated paper support shown in Table 3 were prepared.

(a) Polyethylene resin only
(b) Polyethylene resin containing 3% by weight of anatase type titanium oxide
(c) Polyethylene resin containing 8% by weight of anatase type titanium oxide The mirror glossiness at 60° of these supports were within the range of 52 to 55%.

The both sides of the supports were subjected to with corona discharge treatment, and a gelatin subbing layer was coated thereon so that the coated weight was 0.05 g/m$^2$.

Coating liquid 1-1 prepared in the forgoing manner was coated on one side of the support so as to form a porous ink absorption layer having a dry thickness of 40 μm, then the same coating liquid was coated on the back side of the support so as to form a layer having a dry thickness of 40 μm. Thus Recording sheet 21 through 29 were prepared.

Thus obtained samples were evaluated in the same manner as in Example 1, and the results shown in Table 3 were obtained.

TABLE 3

| Recording Sheet | Weight of Support | Polyethylene resin layer | Opacy of Support | Paper through image visibility | | Spreading of image |
|---|---|---|---|---|---|---|
| | | | | Initial | After storage | |
| 21 (Comp.) | 110 g | (a) | 83.5% | 0.23 | 0.24 | 1.14 |
| 22 (Comp.) | 110 g | (b) | 86.3% | 0.15 | 0.15 | 1.12 |
| 23 (Comp.) | 110 g | (c) | 91.6% | 0.12 | 0.12 | 1.13 |
| 24 (Comp.) | 140 g | (a) | 89.1% | 0.13 | 0.13 | 1.13 |
| 25 (Comp.) | 140 g | (b) | 92.3% | 0.09 | 0.10 | 1.15 |
| 26 (Inv.) | 140 g | (c) | 94.5% | 0.05 | 0.05 | 1.14 |
| 27 (Comp.) | 170 g | (a) | 91.4% | 0.13 | 0.13 | 1.13 |
| 28 (Inv.) | 170 g | (b) | 94.8% | 0.05 | 0.05 | 1.14 |
| 29 (Inv.) | 170 g | (c) | 96.5% | 0.02 | 0.02 | 1.15 |

It is understood according to the results in Table 3 that the paper through image visibility is small and a good image can be obtained in the recording sheet using the support having the opacity of not less than 94%.

It is cleared by the comparison of Table 1 and Table 2 that the paper through image visibility is almost not varied by the storage at the high temperature when the hydrophobic support is used.

According to the results of the evaluation of the stripe-like unevenness formation on recording sheet 21 through 29, no unevenness in the image printed on the back side is observed and a high quality image, rank A, are obtained.

Example 4

Nine kinds of support covered with polyethylene layer on the both sides were prepared in the same manner as in Example 3 except that after extrusion of the polyethylene resin, the surface of one side of the support is matted so as to make the mirror glossiness at 60° of the surface to 8% and the other surface of the support was embossed to form a fine grain surface having a Ra value of 3.2 μm.

The following coating liquid to be coated on the from side was prepared.
Preparation of Silica Dispersion 1

In 600 l of purified water adjusted at a pH value of 3.0 by nitric acid, 125 kg of silica, Aerosil 300 manufactured by Nihon Aerosil Kogyo Co., Ltd., synthesized by a vapor phase method and having an average size of primary particle of 0.007 μm was dispersed by suction at room temperature using Jet Stream Inductor Mixer TDS manufactured by Mitamura Riken Kogyo Co., Ltd. Then the liquid was made up to 660 l to prepare silica dispersion 1.

Preparation of Silica Dispersion 2

To 15 l of an aqueous solution containing 1.29 kg of cation polymer P-1, 4.21 l of ethanol, 1.5 l of n-propanol having a pH value of 2.3, 66.0 l of silica dispersion 1 was added under the liquid surface while stirring with a high speed. Then 7.0 l of an aqueous solution containing 260 g of boric acid and 230 g of borax were added in the same manner as in addition of silica dispersion 1, and 1 g of a defoaming agent SN381 was added. The liquid was further rapidly stirred for 1 hour at 3,000 rpm, and uniformly dispersed by a high pressure homogenizer manufactured by Sanwa Kogyo Co., Ltd. The liquid was made up to 90 l in total with purified water to prepare silica dispersion 2.

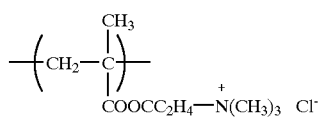

Cation Polymer P-1

Preparation of Fluorescent Whitening Agent Dispersion 1

Four hundreds grams of oil-soluble fluorescent whitening agent UBITEX-OB, manufactured by Ciba-Geigy Co., Ltd., was dissolved in 4,000 g of diisodecyl phthalate, antioxidant (2,4-di-t-amyl-hydroquinone-di-n-octyl ether) and 12 l of ethyl acetate. Thus obtained solution was mixed with 65 l of an aqueous solution containing 3,500 g of acid processed gelatin, cation polymer P-1, and 6,000 ml of a 50% aqueous solution of saponine, and dispersed by the high pressure homogenizer manufactured by Sanwa Kogyo Co., Ltd. The dispersion was made up 100 l in total after removing the ethyl. acetate under a reduced pressure.
Preparation Matting Agent Dispersion 1

To 7 l of purified water containing 30 g of the foregoing PVA235, 600 g of poly(methacrylate) matting agent MX-1500, manufactured by Soken Kagaku Co., Ltd., was added and dispersed by a high speed homogenizer. Then the dispersion was made up to 8 l in total.
Preparation of Coating Liquid The coating solutions for the first, second and third layers were prepared in the following procedures.

Coating Liquid for First Layer

The following additives were added in the following order into 560 ml of silica dispersion 2 while stirring at 40° C.

| | |
|---|---|
| 10% aqueous solution of polyvinyl alcohol (PVA203, manufactured by KURARAY CO., LTD..) | 6 ml |
| 5% aqueous solution of polyvinyl alcohol (PVA235, manufactured by KURARAY CO., LTD..) | 260 ml |
| Fluorescent whitening agent dispersion 1 | 22 ml |
| Latex emulsion (AE-803 manufactured by Daiich Kogyo Co., Ltd.) | 24 ml |
| Purified water to make | 1,000 ml |

Coating Liquid for Second Layer

The following additives were added in the following order into 560 ml of silica dispersion 2 while stirring at 40° C.

| | |
|---|---|
| 10% aqueous solution of polyvinyl alcohol (PVA203, manufactured by KURARAY CO., LTD.) | 6 ml |
| 5% aqueous solution of polyvinyl alcohol (PVA235, manufactured by KURARAY CO., LTD..) | 270 ml |
| Fluorescent whitening agent dispersion 1 | 30 ml |
| Latex emulsion (AE-803 manufactured by Daiich Kogyo Co., Ltd.) | 4 ml |
| Purified water to make | 1,000 ml |

Coating Liquid for Third Layer

| | |
|---|---|
| 10% aqueous solution of polyvinyl alcohol (PVA203, manufactured by KURARAY CO., LTD..) | 6 ml |
| 5% aqueous solution of polyvinyl alcohol (PVA235, manufactured by KURARAY CO., LTD..) | 270 ml |
| Silicone dispersion (BY-22-839, manufactured by Toray-Dow Coaning-Silicone Co., Ltd.) | 3.5 ml |
| 50% aqueous solution of saponin | 4 ml |
| Matting agent dispersion 1 | 25 ml |
| Purified water to make | 1,000 ml |

The coating solutions prepared as above were filtered by the following filters.

Coating liquids of first and second layers:

Double steps filtration by TCP10 manufactured by Toyo Roshi Co., Ltd.

Coating liquid of third layer:

Double steps filtration by TCP30 manufactured by Toyo Roshi Co., Ltd.

The first, second and third layer each having a wet thickness of 40 μm, 110 μm and 30 μm, respectively, were coated in this order on the fine grain side of each of the foregoing nine kinds of polyethylene laminated support.

The coating of the three layers was carried out simultaneously at 40° C. using a three layer slide hopper coater. The coated layers were cooled for 20 seconds just after coating in a cooling zone maintained at 8° C., and dried for 60 seconds by wind of 20° C. to 30° C., for 60 seconds by wind of 45° C. and for 60 seconds by wind of 50° C. in due order. Then the moisture of the coated matter was regulated at a temperature of 23° C. and a relative humidity of from 40 to 60%.

Next, the first, seconds and third layers each having a wet thickness of 50 μm 110 μm and 20 μm, respectively, were coated using the same coating liquids on the opposite matted surface of the support and dried under the condition the same as in the coating of the fine grain side. Thus samples of recording sheet 31 through 39 were obtained.

The mirror glossiness at 60° of the fine grain side and matted side of the samples were each within the range of from about 25 to 27% and 12 to 14%, respectively.

The difference of the color of white background of the front side and the back side ΔE was not more than 3 in each of the samples.

The samples were evaluated in the same manner as in Example 1, and the effects of the invention were confirmed. A high quality print without paper through image visibility was obtained when the images were printed on both sides of the recording sheet using the support having the opacity of not less than 94%. The samples of Example 4 were subjected to the evaluation of the formation of stripe-like unevenness of image. The stripe-like unevenness was not observed, rank A, in each of the samples and a high quality image can be obtained on each of the samples.

Example 5

A frame of postal code was printed on the matted side of each of the samples of recording sheet prepared in Example 4. The samples were each cut into a post card size to prepare a post card for ink-jet printing. Characters such as a post address were printed by a ink-jet printer on the matted side and a colored image was printed on the opposite side of the post card. The character image was clearly looked in the colored image in the sample using the support having the opacity of less than 94%. In contrast, post cards having a high quality colored image with a little paper through visibility of the character image can be obtained by Recording sheet samples 36, 38 and 39 using the support having the opacity of not less than 94%.

The paper through image visibility in each of the samples was almost not varied when the post cards were stored for 3 days at a temperature of 40° C. and a relative humidity of 80%.

Example 6

Colored images were printed by an ink-jet printer on both sides of Recording sheet samples 36, 38 and 39 prepared in Example 4. Thus plural printed sheets were prepared. The printed sheets were bound at one edge thereof to make an album of prints. An album was prepared in which the surface quality of the facing pages were different from each other in the surface quality thereof.

Example 7

Recording sheet 48, 58, 68 and 78 were prepared in the same manner as in sample 38 except that the ink absorption layer on the matted side was changed as follows.

Recording sheet 48: the coating liquid was changed to that prepared in Example 1.

Recording sheet 58: the coating liquid was changed by the liquid prepared in Example 1 to which 2 g/l of a fluorinated surfactant was additionally added.

Recording sheet 68: the same as recording sheet 38 except that the silicone dispersion in the third layer was omitted.

Recording sheet 78: the same as recording sheet 38 except that the silicone dispersion in the third layer was increased by 3 times.

An image was printed on each of thus obtained samples to measure the dot size of the image.

An neutral gray image having a reflective density of about 0.8 was printed on the fine grain surface side of the recording sheet and the same image was printed on the matted side under the same condition, and the difference of the color of the images on the different side of the recording sheet.

Results are shown in Table 4. In the table, D1 and D2 are each the size in μm of the dot formed on the fine grain surface and the matted surface, respectively.

TABLE 4

| Recording | Dot Size | | | Color |
|---|---|---|---|---|
| Sheet | D1 | D2 | D1/D2 | Difference (ΔE) |
| 38 | 60 | 61 | 0.98 | 2.3 |
| 48 | 60 | 56 | 1.07 | 8.5 |
| 58 | 60 | 52 | 1.15 | 14.2 |
| 68 | 60 | 58 | 1.03 | 3.5 |
| 78 | 60 | 69 | 0.87 | 12.8 |

As is shown in Table 4, the images formed on both sides of the recording sheet each have almost the same tone when the ratio of D1/D2 is within the range of from 0.9 to 1.1. Accordingly, such the images can be used for making the album of prints.

On the other hand, when the D1/D2 is less than 0.9 or more than 1.1, the tone of the images are different from each other depending on the surface quality. Accordingly, such the recording sheet is unsuitable for the use of the print album.

However, the difference of the tone between the different surface does not cause a problem when the print is used for the post card use. It is confirmed in Recording sheet 38, 48, 58, 68 and 78 that the invention is effective on the paper through image visibility and the spreading of image.

According to the invention, an ink-jet recording sheet in which the loss of the image density is inhibited and the image printed on one side of the paper is difficultly seen from the opposite side through the paper when images are printed on both sides of the paper, can be obtained by the ink-jet recording sheet having the ink absorption layers containing the cationic substance on the both sides of the paper.

What is claimed is:

1. An ink-jet recording sheet comprising a support and ink absorption layers provided on both sides of the support wherein the support has an opacity of not less than 94% according to JIS P 8138 and the ink absorption layer on each side contains a cationic substance.

2. The ink-jet recording sheet of claim 1 wherein the a support has a Kobb Test permeability of not more than 10 g per square meter determined according to JIS P 8140 using pure water containing 30% by weight of diethylene glycol for a contacting time of 10 seconds.

3. The ink-jet recording sheet of claim 1 wherein the support is a hydrophobic support.

4. The ink-jet recording sheet of claim 1 wherein the support is a support comprised of a paper substrate covered with polyolefin resin layers on the both sides thereof, and at least one of the olefin resin layers contains a white pigment.

5. The ink-jet recording sheet of claim 1 wherein each of the ink absorption layers provided on both sides of the support includes at least one porous layer.

6. The ink-jet recording sheet of claim 1 wherein ratio of D1/D2 is within the range of from 0.90 to 1.1 wherein D1 and D2 are each the diameter of dot formed by a droplet of ink adhered on the ink absorption layer provided on one side of the support and that of the dot formed on ink absorption layer provided on the other side of the support, respectively.

7. The ink-jet recording sheet of claim 1 wherein the support is a plastic film support containing a white pigment.

8. The ink-jet recording sheet of claim 4, wherein the support has a weight of from 100 g to 250 g per square meter.

9. The ink-jet recording sheet of claim 1 wherein cationic substance is a compound having a quaternary ammonium salt group.

10. The ink-jet recording sheet of claim 1 wherein a static friction coefficient of both sides of the recording sheet is from 0.2 to 0.8.

11. The ink-jet recording sheet of claim 5 wherein a static friction coefficient of both sides of the recording sheet is from 0.2 to 0.8.

* * * * *